Nov. 2, 1926.  
T. J. BURKE  
UNIVERSAL PIPE JOINT  
Filed Jan. 18, 1924    2 Sheets-Sheet 1
1,605,507
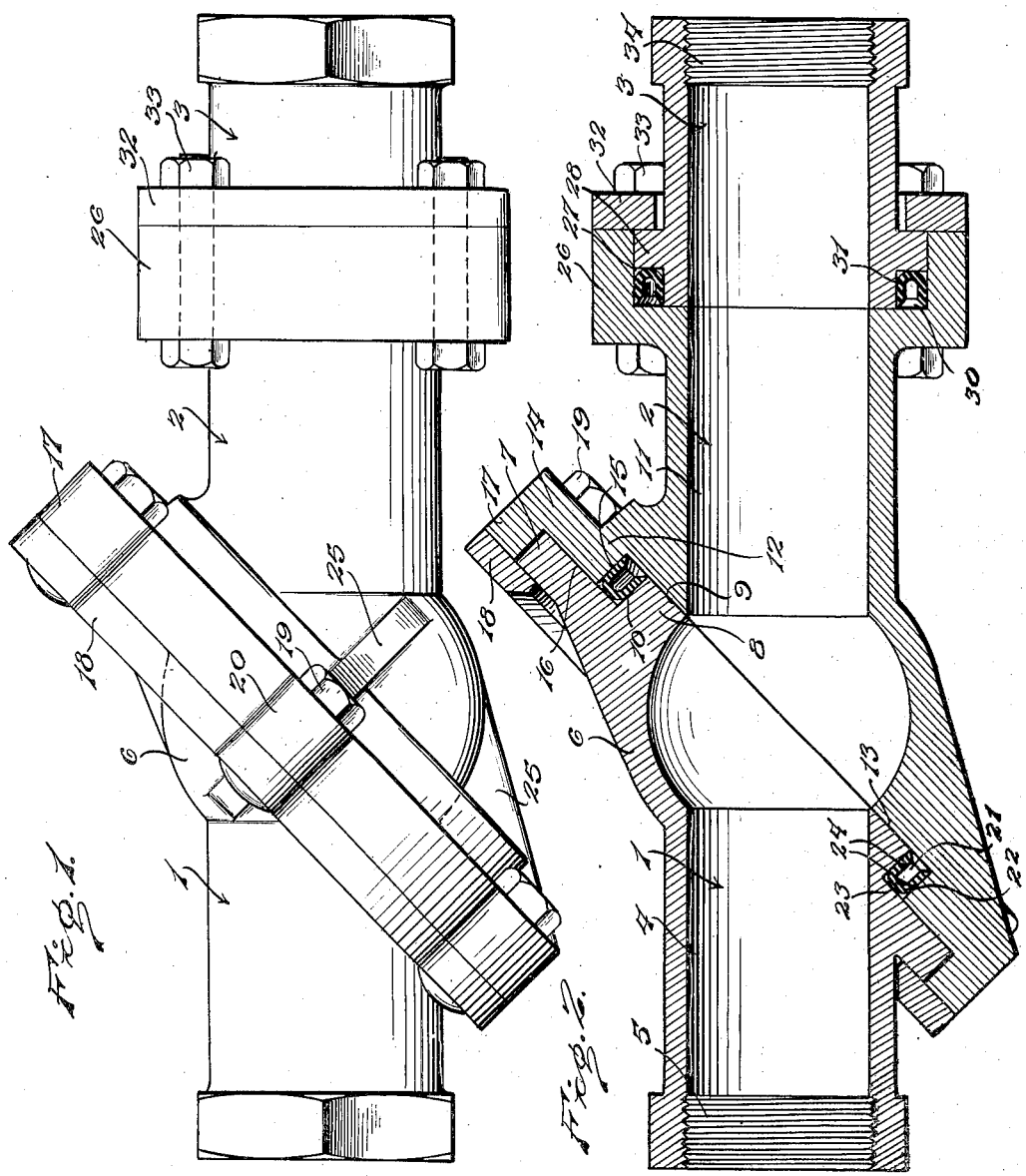
Inventor
T. J. Burke
By Lacy & Lacy, Attorneys Nov. 2, 1926.                                        1,605,507
T. J. BURKE
UNIVERSAL PIPE JOINT
Filed Jan. 18, 1924          2 Sheets-Sheet 2
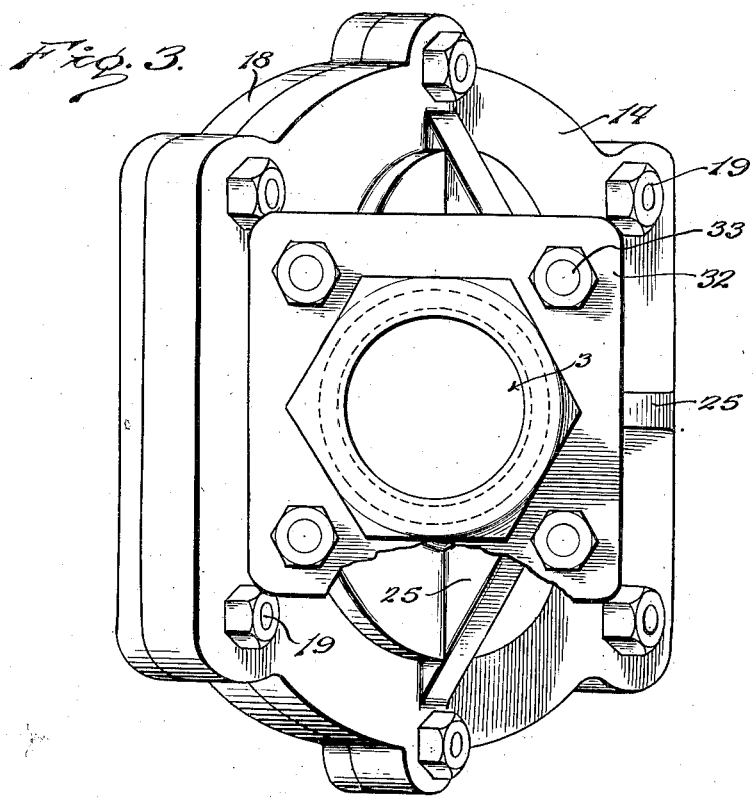
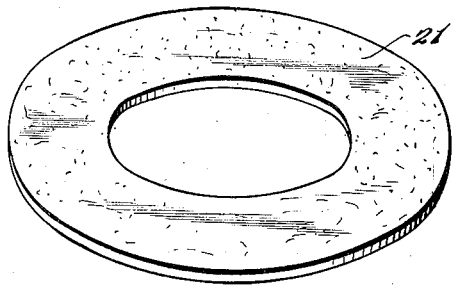
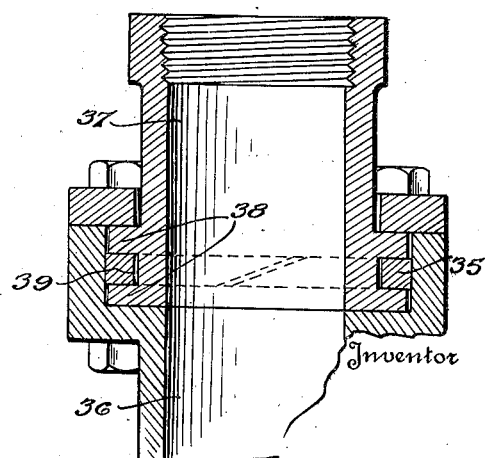
Inventor
T. J. Burke
By Lacy Lacy, Attorneys Patented Nov. 2, 1926.

1,605,507

UNITED STATES PATENT OFFICE.

THOMAS J. BURKE, OF NEW ORLEANS, LOUISIANA.

UNIVERSAL PIPE JOINT.

Application filed January 18, 1924. Serial No. 687,049.

This invention relates to improvements in universal pipe joints and has as one of its objects to provide a joint which will permit of perfect freedom of adjustment of the pipes connected by the joint and at the same time provide for a maximum range of relative adjustment of the said pipes.

Another object of the invention is to provide a universal pipe joint the component parts of which may be readily assembled and disassembled so as to permit of convenient factory assembly of the parts and likewise permit of convenient renewal of the packing elements when occasion requires.

Another object of the invention is to provide an extremely simple and substantial form of joint which will not be liable to disarrangement of its parts and which will be substantially proof against leakage.

Another object of the invention is to provide a joint of such construction that it will not be bulky as compared to the diameter of the pipes which it connects.

Another object of the invention is to so construct the joint that the fluid passing therethrough will have a clear passage free from obstructions such as tie bolts or other interior swivel connections or the like.

Another object of the invention is to provide a novel form of packing element and a novel construction of the joint parts providing a housing for the said element so that leakage is effectually prevented.

Another object of the invention is to provide a packing of such form and adapted to be so placed as to permit of the joint being employed either where the fluid is under pressure or where there is a suction or partial vacuum.

In the accompanying drawings:

Figure 1 is a side elevation of a pipe joint constructed in accordance with the present invention, Figure 2 is a vertical longitudinal sectional view through the joint, Figure 3 is an end elevation in detail of the joint, Figure 4 is a perspective view of the packing element in its initial form, Figure 5 is a diametric sectional view illustrating a modified form of the invention.

Generally speaking, the joint embodying the invention comprises sections indicated in general by the numerals 1 and 2 which have confronting parts connected to a swivel obliquely disposed at an angle of forty-five degrees to the axes of the sections, and a third section indicated in general by the numeral 3 and connected to swivel axially with relation to the section 2. The section 1 comprises a tubular body 4 which is interiorly threaded at one end as indicated by the numeral 5, to accommodate the end of one of the pipes to be connected. This tubular body is provided at its other end with a head which is indicated by the numeral 6 and which has more or less the form of a sector of a hollow sphere. The head 6 is provided with a circumferential flange which is indicated by the numeral 7, and as this flange constitutes a part which is to confront and be assembled with the associated end of the section 2, it occupies substantially a plane at an angle of forty-five degrees to the axis of the tubular body 4 of the section 1 of which it forms a part. The head 6, being hollow, is in communication with bore of the body 4 and the open side of the head, at the interior thereof, is surrounded by a circumferential boss 8 having a seating face indicated by the numeral 9, this face being flat and, if desired, ground. The boss 8 is exteriorly circumferentially of a diameter less than the diameter of the flange 7 so that its outer circumferential surface, which is indicated by the numeral 10, may constitute one wall of a packing housing as will presently be explained.

The section 2 of the joint comprises a cylindrical body 11 which at one end is provided with a head 12 which is to be associated with the head 6 of the section 1. The head 12 is provided with a seating face 13 which is obliquely disposed at an angle of forty-five degrees with relation to the axis of the body 11 and which is plane and may, if desired, be ground. The head 12 is provided with a circumferential offset 14, the inner circumferential face 15 of which is adapted to constitute another wall of the housing in which the packing is received as before referred to. The outwardly presented face of the offset 14 of the head 12, which face is indicated by the numeral 16, is likewise plane and is stepped with relation to the face 13 of the said head. In the assembled relationship of the sections 1 and 2, the seating face 9 of the head 6 of the section 1 will contact the face 13 of the head 12 of the section 2 substantially in a fluid-tight manner, and this is likewise true of the seating face 16 of the offset 14 and the confronting face of the flange 7 of the section 1. The offset 14 of the head of the section 2 is provided with a circumferential flange 17 which projects from the plane of the seating face 16 and surrounds the said face as well as the periphery of the flange 7, the depth of the flange 17 being substantially equal to the thickness of the flange 7. A cap ring 18 is secured by stud bolts 19 or bolts and nuts, if preferred, to the offset 14 of the head 12 of the section 2, the said bolts being fitted through ears or lugs 20 formed upon the peripheries of the offset and the cap ring, as clearly shown in Figures 1 and 3 of the drawings. The outer periphery of the cap ring 18 is in registration with the outer circumferential surface of the flange 17, but the cap ring is of a width, at any point in its circumference, greater than the thickness of the flange 17, so that the inner peripheral portion of the cap ring overlies the flange 7 of the head 6 of the section 1 in the manner best shown in Figure 2 of the drawings and serves to hold the heads together in their properly assembled relation, it being understood, of course, that the heads may have free relative swiveling movement. By reference to Figure 2 of the drawings, it will be observed that the walls 10 and 15, and the portions of the faces 9 and 13 which span the space between these walls, define an annular chamber 21 to accommodate a packing element which is indicated by the numeral 22. The packing element 22 is initially in the form of a flat leather ring, as shown in Figure 4 of the drawings, and at the time of assembling the parts the ring is folded on a circular line midway between its inner and outer peripheries, thereby providing a connecting portion 23 and side flaps 24. The tendency, of course, is for the side flaps 24 of the ring to spread apart and they therefore, snugly bear against the wall surfaces 10 and 15 when the parts are assembled. The ring is so proportioned as regards its dimensions and as regards the dimensions of the walls 10 and 15, that when folded or doubled to the required form, the outer surface of the connecting portion 23 of the ring will contact the seating face 16 where this face spans the space between the walls 10 and 15, and the edges of the flaps 24 will snugly contact the seating face 9 where it spans the space between said walls 10 and 15.

It will now be evident that while the sections 1 and 2 may have relative swiveling movement with perfect freedom, preferably the heads 6 and 12 are reinforced exteriorly by fins 25 and in this manner it is possible to form the heads of smaller external diameter than would otherwise be practicable so that the joint is not bulky as compared with the diameter of the pipes which it is to connect.

The section 2 is provided at its end opposite the end at which the head 12 is located, with an offset circumferential flange indicated by the numeral 26, which is exteriorly preferably of substantially rectangular form as shown in Figure 3 of the drawings, the inner surface of the flange, however, being of cylindrical contour, and constituting a wall indicated by the numeral 27. The section 3 is adapted to be fitted rotatably within the flange 26 and is provided with a circumferential flange 28 spaced inwardly from its said end and of a diameter to rotatably and snugly fit within the recess defined by the said wall 27. The end of the section 3 abuts the end of the body 11 of the section 2, as clearly shown in Figure 2 of the drawings, and which end of the section presents a seating face indicated by the numeral 29. It will now be evident that the inner surface 27 of the flange 26, the seating face 29 of the body 11 of the section 2, the face of the flange 28 which opposes said seating face 29, and the exterior surface of the body of the section 3 define an annular chamber 30 to accommodate a packing element which is indicated by the numeral 31. The packing element 31 is identical in its construction with the element 22 previously described.

By reference to Figure 2 of the drawings, it will be evident that any fluid under pressure which might by any possibility pass between the seating faces 9 and 13 of the sections 1 and 2, or the seating face 29 and abutting ends of the sections 2 and 3, would, if under sufficient pressure, enter the recess in the packing elements 23 and 31 respectively and tend, if anything, to further spread the flaps of the said elements and more firmly bind them against the walls of the packing housings, thereby positively insuring against escape of the fluid. It will be evident, therefore, that the packing elements as arranged in Figure 2, are intended to be employed where a fluid under pressure is to be passed through the joint. Where the joint is interposed in a suction line, however, the packing will be reversed. In order to retain the sections 2 and 3 in their assembled relation, a cap ring 32 corresponding to the ring 18 is secured by bolts 33 to the offset flange 26 of the section 2 and at its inner peripheral portion overhangs the flange 28 of the said section 3, and in order to permit of attachment of the other pipe to the section 3, said section at its outer end is interiorly threaded as indicated by the numeral 34.

Figure 5 of the drawings illustrates a modification of the invention and more especially as regards the packing element. In this modified form, the packing element, which is indicated by the numeral 35, constitutes a split metallic ring closely resembling the well-known piston ring, and where the ring is employed as a packing element between the sections corresponding to the sections 2 and 3, and which sections in the said figure are indicated respectively by the numerals 36 and 37, the section 37 will be provided with spaced circumferential flanges 38 to provide a groove 39 to receive the said packing ring, the structure being otherwise substantially identical with that previously described. Of course, a ring such as the ring 35 may equally well be employed in the structure shown in Figure 2, and as a packing element between the sections 1 and 2, it being in such case, within the annular chamber 21 in lieu of the packing element 22.

It will be evident that the fins 25 serve not only, as previously stated, to reinforce the walls of the heads 6 and 12 but also serve to reinforce the flanges 7 and 14, thus permitting of these parts being made thinner and lighter than would otherwise be practicable.

While in the illustrated embodiment of the invention, the flange 7 and cap ring 18 and the flange 26 and cap ring 32 are connected by bolts, these parts may be connected by screw threads in joints of smaller sizes.

It will be evident that in view of the fact that the interior of the head of each section is of the contour of a sector of a sphere, free and unobstructed flow of fluid or matter through the pipes and the joint connected thereby will be had regardless of the angle to which the joint sections are adjusted, as well as when the sections are in alinement. For example, if the sections are rotated to assume an angle of 90° with respect to each other, precisely the same character of passageway will be provided as in the instance of two ordinary pipes connected by an ordinary elbow.

Having thus described the invention, what is claimed as new is:

A pipe joint comprising sections assembled end to end, said sections each having its inner end formed with an annular edge disposed in a plane extending diagonally with respect to the axis of the section and adapted for face to face contact with the annular edge of the other section, a collar extending circumferentially about one section in a plane spaced from and parallel to the end thereof to provide the section with an extended end portion, an annular flange carried by the other section and having face to face contact with the collar of the first-mentioned section, said flange being of greater dimensions than said collar and having its inner peripheral edge face spaced from the outer peripheral face of the extended end portion of the first-mentioned section to define an annular packing receiving pocket between the sections, packing in said pocket, an upstanding annular wall carried by said flange and surrounding said wall and overlapping said collar, and removable means carried by said collar to retain the sections joined and permit turning of one with respect to the other.

In testimony whereof I affix my signature.

THOMAS J. BURKE. [L. S.]